United States Patent [19]

Blanchard et al.

[11] Patent Number: 5,786,415
[45] Date of Patent: Jul. 28, 1998

[54] USE OF STYRENE AND MALEIC ANHYDRIDE COPOLYMERS AS DISPERSING AGENTS AND/OR FOR TREATMENT OF MINERAL FILLERS AND THERMOPLASTIC COMPOUNDS CONTAINING SAME

[75] Inventors: Pierre Blanchard, Reyrieux; Patrick Trouve, Clamart, both of France

[73] Assignee: Coatex S.A., Genay, France

[21] Appl. No.: 767,431

[22] Filed: Dec. 16, 1996

[30] Foreign Application Priority Data

Dec. 14, 1995 [FR] France .................. 95 15012

[51] Int. Cl.$^6$ .................................................. C08K 3/26
[52] U.S. Cl. ................. 524/423; 524/431; 524/433; 524/436; 524/437; 524/444; 524/447; 524/449; 524/451; 524/445; 524/522; 525/207
[58] Field of Search .................... 524/425, 431, 524/433, 436, 437, 444, 447, 449, 451, 445, 522

[56] References Cited

U.S. PATENT DOCUMENTS

| | | |
|---|---|---|
| 3,766,109 | 10/1973 | Pratt et al. . |
| 4,421,892 | 12/1983 | Kasahara et al. ............ 524/514 |
| 5,001,182 | 3/1991 | Maruya et al. ............ 524/427 |
| 5,030,662 | 7/1991 | Banerjie . |
| 5,321,081 | 6/1994 | Chundury et al. ............ 525/98 |

FOREIGN PATENT DOCUMENTS

| | | |
|---|---|---|
| 0 042 724 | 12/1981 | European Pat. Off. . |
| 0 156 072 | 10/1985 | European Pat. Off. . |
| 0 224 688 | 6/1987 | European Pat. Off. . |

OTHER PUBLICATIONS

Database WPI, Derwent Publications Ltd., AN 93–232524, JP 5–156128, Jun. 22, 1993.
Database WPI, Derwent Publications, Ltd., AN 84–130921, JP 5–9066434, Apr. 14, 1984.

*Primary Examiner*—David W. Wu
*Attorney, Agent, or Firm*—Oblon, Spivak, McClelland, Maier & Neustadt, P.C.

[57] ABSTRACT

The present invention relates to a method of dispersing or treating a mineral filler into a thermoplastic resin; the dispersing agent or agent for treatment of a mineral filler is a styrene-maleic anhydride copolymer, having an weight average molecular weight preferably between 1000 to 3000; the thermoplastic resin is selected from (a) a hydrocarbon homopolymer without an aryl group, (b) a copolymer without an aryl group, and with a molecule comprised of carbon, hydrogen and oxygen in which the content of oxygen atoms does not exceed 22% by weight or (c) a mixture of the above described homopolymer and copolymer; the mineral fillers are basic or have surfaces that have free hydroxyl groups. The present invention relates also to thermoplastic compounds which are highly filled, stable, fluid and homogeneous and which contain mineral agents; further these compositions are useful in the fabrication of plastic products.

8 Claims, No Drawings

USE OF STYRENE AND MALEIC ANHYDRIDE COPOLYMERS AS DISPERSING AGENTS AND/OR FOR TREATMENT OF MINERAL FILLERS AND THERMOPLASTIC COMPOUNDS CONTAINING SAME

FIELD OF THE INVENTION

This invention relates to the use of a styrene-maleic anhydride copolymer as dispersing agent and/or for treatment of a basic pulverulent mineral filler or a filler having free hydroxyl groups on its surface, in a thermoplastic resin. The resulting thermoplastic compound exhibits good fluidity. The invention also relates to the thermoplastic compounds and their use in the fabrication of plastic products.

BACKGROUND OF THE INVENTION

Dispersing agents used to incorporate mineral materials into thermoplastic resins have been known. Thus, the U.S. Pat. Nos. 4,412,026 and 5,001,182 disclose the use of fatty acids or their esters, as well as organic compounds of the silane or titanate type, as coupling agents in order to introduce up to 20% by weight of talc into the thermoplastic resin to obtain good object rigidity.

Also, it is well known that one can use compounds such as metallic salts of a fatty acid, for example calcium stearate (U.S. Pat. No. 4,255,303) or combinations of octyl or oxyethylated nonylphenol with polyoxyethylene glycols (U.S. Pat. No. 4,927,874 and U.S. Pat. No. 4,931,493) to treat talcs in order to incorporate them into thermoplastic resins. However, such processes allow one to obtain only filled compounds with degraded mechanical properties.

It is also known that one can use dispersing or treating agents that contain at least one unsaturated component (EP 7190—GB 1,603,300) to treat mineral fillers with acid surface such as certain talcs. Such agents, however, are not particularly suitable for all types of talc.

There are also methods for the dispersion of pulverulent mineral fillers that use phosphonated dispersing agents (DE 2,735,160) or sulfonated dispersing agents (EP 0,017,038) or different methods (JP 80-142039, JP 78-65346, JP 75-109239) which allow the dispersion of certain talcs in polypropylene. However, in this case not all talcs are dispersed with the same efficiency in the polymer material that would thereby result in thermoplastic compounds with decreased physicochemical properties.

To date, thermoplastic compounds filled with talc are not entirely satisfactory concerning their viscosity level. These thermoplastic compounds do not allow one to carry out difficult manipulations during the fabrication of master batches or of plastic objects.

SUMMARY OF THE INVENTION

It has now been found, in a quite unexpected way, that the use of a styrene-maleic anhydride-based copolymer having a weight average molecular weight between 1000 and 3000, preferably between 1500 and 2000, allows the dispersion of large quantities of basic pulverulent mineral fillers or fillers having surfaces that have free hydroxyl groups, into a thermoplastic resin. All molecular weight are expressed as weight average molecular weight throughout this application. The thermoplastic resin is selected from (a) a hydrocarbon homopolymer without an aryl group, (b) a copolymer without an aryl group and with a molecule comprised only of carbon, hydrogen and oxygen whose content of oxygen atoms does not exceed 22% by weight, or (c) a mixture of the above described homopolymer and copolymer. The resulting thermoplastic compound is homogeneous, stable and very fluid. Further the resulting thermoplastic compound exhibits an increased fluidity index (MFI), and is capable of being easily redispersed during its use in the course of the fabrication of plastic objects. The dispersable fillers, in accordance with the present invention, are selected from calcium carbonate, talc, wollastonite, kaolin, pyrogenetic silicon, aluminum silicate, mica, and other metal hydroxides.

DESCRIPTION OF THE PREFERRED EMBODIMENTS

It is an object of the present invention to provide a method of dispersing or treating a basic pulverulent mineral filler or a filler with surface containing free hydroxyl groups, into a thermoplastic resin by using a styrene-maleic anhydride copolymer as dispersing agent. The preferred styrene-maleic anhydride copolymer has a weight average molecular weight of 1000 to 3000, a more preferred range is 1500 and 2000. The thermoplastic resin is selected from (a) a hydrocarbon homopolymer without an aryl group, (b) a copolymer without an aryl group, and with a molecule comprised only of carbon, hydrogen and oxygen whose content of oxygen atoms does not exceed 22% by weight, or (c) a mixture of the above described homopolymer and copolymer. Thus, the present invention provides a thermoplastic compound highly filled, stable, fluid, and homogeneous. The fluidity index (MFI) of the thermoplastic compound in accordance with the present invention is elevated as compared with MFI of a thermoplastic compound that does not contain the styrene-maleic anhydride copolymer. The term "aryl" refers to phenyl, naphthyl or anthracenyl. The term "thermoplastic resin" is used throughout this application in accordance with the conventional rqeaning to denote a thermoplastic homopolymer or copolymer. The term "thermoplastic compound" is used to denote a thermoplastic resin compounded with additives such as fillers, processing aids dispersing aids, pigments and the like.

It is another object of the invention to provide a thermoplastic compound which is homogenous, stable and fluid and which exhibits a fluidity index (MFI) that is greatly elevated. The thermoplastic compound encompasses a thermoplastic resin selected from (a) a hydrocarbon homopolymer without an aryl group, (b) a copolymer without an aryl group and with a molecule comprised only of carbon, hydrogen and oxygen whose content of oxygen atoms does not exceed 22% by weight and (c) a mixture of the above described homopolymer and copolymer. The thermoplastic compound further includes a styrene-maleic anhydride copolymer as dispersing agent. The thermoplastic compound is homogeneous stable and fluid when filled up to 80% by weight, based on the total weight of the filler and the resin, with a basic pulverulent mineral filler or with filler containing available free hydroxyl groups on its surface. Further, the thermoplastic compound exhibits a fluidity index (MFI) that is greatly elevated. In addition, the thermoplastic compound optionally includes conventional additives.

Thus, while the prior art describes many types of dispersing agents for mineral fillers in thermoplastic resins, these dispersing agents do not allow one to equally disperse, or disperse in high concentration, all types of basic pulverulent mineral fillers or those fillers with surfaces having available free hydroxyl groups. The invention is distinguished by the use as dispersing agents of copolymers based only on styrene-maleic anhydride. Thus, the present invention provides a method to equally and efficiently disperse a wide range of concentrations of pulverulent mineral fillers that are basic or that have a surface with available free hydroxyl groups.

The styrene-maleic anhydride copolymers used as dispersing agents and/or agents for treatment of pulverulent mineral fillers in accordance with the present invention preferably have a weight average molecular weight between 1000 and 3000, and more preferably between 1500 and 2000.

The basic pulverulent mineral filler or a filler with a surface that has free hydroxyl groups, can be selected from among natural or synthetic calcium carbonate, silicate, such as talc, kaolin, silicate of aluminum, mica, silicate of calcium, such as wollastonite, bentonite, or among pyrogenetic silica or mixtures thereof. Also, they can be selected among metal hydroxides such as, for example, the hydroxide of magnesium, aluminum, calcium, iron or others, or mixtures of these hydroxides. A preferred pulverulent mineral filler or one with a surface that has free hydroxyl groups is selected from among talc, natural or synthetic calcium carbonate, kaolin, wollastonite, pyrogenetic silica, the hydroxide of magnesium or mixtures thereof and more preferably from among the talcs.

The basic pulverulent mineral filler or a filler with a surface that has free hydroxyl groups will preferably have a particle size diameter between 0.01 and 100 micrometers (The method for determining the particle size of a filler is specified for the particular filler in the Examples that follow). The quantity of pulverulent mineral material introduced into the thermoplastic compound as well as the MFI of these thermoplastic compounds will depend not only on the above described mineral material but also on its particle size.

Suitable thermoplastic resins include, but are not limited to, homopolymers or copolymers of ethylene, propylene, butene, butadiene, butylene and its isomers, ethylene-vinyl acetate (EVA) or others. More preferred thermoplastic resins are selected from polypropylene, polyethylene, copolymers of ethylene-propylene, and copolymers of butene. Most preferred thermoplastic resin is polypropylene.

Suitable optional additives include, but are not limited to, thermal or photochemical stabilizers, anti-oxidants, lubricants, plasticizers, anti-static agents, fire retarding agents, deactivators of metals, glass balls, mineral and/or organic fibers, pigments, and other components.

The thermoplastic compound in accordance with the invention encompasses:

(i) a thermoplastic resin;

(ii) 20 to 80% by weight, based on the total weight of the filler and of the resin, of a basic pulverulent mineral filler or a filler with a surface that has available free hydroxyl groups;

(iii) 0.25% to 3.0% by weight and preferably 0.5% to 1.0% by weight, based on the total weight of the pulverulent mineral filler, of a styrene-maleic anhydride copolymer with a weight average molecular weight between 1000 and 3000, preferably between 1500 and 2000; and (iv) optionally, other conventional additives.

Preferred thermoplastic resins include, but are not limited to, homopolymers or copolymers of ethylene, propylene, butene, butadiene, butylene and its isomers and ethylene-vinyl acetate; more preferred thermoplastic resins are those selected from polypropylene, polyethylene, copolymers of ethylene-propylene and copolymers of butene. Most preferred thermoplastic resin is polypropylene;

Preferred materials for component (ii) include, but are not limited to, natural or synthetic calcium carbonate, talc, kaolin, wollastonite, pyrogenetic silica, magnesium hydroxide, aluminum hydroxide or mixtures thereof; more preferred materials are those selected from among the talcs;

The fluidity of the thermoplastic compound in accordance with the present invention is determined by measurement of the fluidity index (MFI). This is carried out using the commercially available device marketed by Zwick company, type 4105.

The fluidity index (MFI) is deemed, according to ASTM 1238 standard, as being the quantity expressed in grams for 10 minutes, of a polymer and/or copolymer flowing at a selected temperature in the interval bounded by the softening and transformation temperatures under a standardized given load (2.16 kg and 10 kg) through a die of predetermined diameter (2.09 to 2.10 millimeters) during a certain measured time.

With respect to compounds of the prior art, the improvement of thermoplastic compounds in accordance with the invention result in viscosity reduction; therefore, there is an increase of the fluidity index MFI. This viscosity decrease allows easier use of the thermoplastic in accordance with the invention during fabrication of masterbatches or of a plastic object.

Having generally described this invention a further understanding can be obtained by reference to certain specific examples which are provided herein for purpose of illustration only and are not intended to be limiting unless otherwise specified.

EXAMPLES

Example 1

This example pertains to the use of various dispersing agents for the purpose of dispersing talc in a polypropylene resin in order to evaluate the dispersing effectiveness of the dispersing agent and the ability to supply a compound of polypropylene which is highly filled, fluid, and homogenous. In other words, it has an elevated fluidity index.

For each test pertaining to the various tested agents, as well as for the control test, we have introduced, in a 1.5 liter capacity Guittard mixing unit, equipped with a Z-shaped arm and having a tank that is electrically heated to 240° C, 300 grams of pulverulent talc, obtained from Finland and marketed by the company Finnminerals under the trade name FINNTALC M05, and in which 97% of the particles have an average diameter less than 10 micrometers.

After 15 minutes of pre-heating the filler to 240° C., 2.25 grams of the dispersing agent to be tested were introduced for the test pertaining to various agents to be tested. Then simultaneously, 0.25 grams of thermal stabilizer sold by Ciba-Geigy company under the trade name IRGANOX 1010 is introduced along with 196.2 grams of a homopolymer polypropylene resin sold by Appryl company under the trade name PPH 3120 MN 1. Alternatively, directly and simultaneously 0.25 grams of the above described stabilizer and 196.2 grams of the above described resin for the control test were introduced.

The batch was mixed for 15 minutes at this temperature and at a speed of 42 rpm.

With the mixture prepared in this manner, we then calendered one part of this mixture in the form of sheets which were cut into small cubes of 2 to 3 millimeters on each side and for which we have measured at 230° C. the fluidity index MFI under a load of 2.16 kg and 10 kg.

The various tested agents were the following:

Test No. 1

This test is a control test, and no dispersing agent is used.

Test No. 2

This test uses, as the dispersing agent, a sulfonated styrene-maleic anhydride copolymer with a weight average molecular weight of about 1500.

Test No. 3

As the dispersing agent, this test uses a sulfonated styrene-maleic anhydride copolymer with a weight average molecular weight of about 2000.

Test No. 4

Illustrated in the prior art, this test uses a stearyl phosphate as the dispersing agent.

Test No. 5

This test, in accordance with the invention, uses a styrene-maleic anhydride copolymer with a weight average molecular weight of about 1600 as a dispersing agent.

Test No. 6

This test, in accordance with the invention, uses a styrene-maleic anhydride copolymer with a weight average molecular weight of about 1700 as a dispersing agent.

Test No. 7

This test demonstrating the invention uses a styrene-maleic anhydride copolymer with a weight average molecular weight equal to 1900 as a dispersing agent.

The results are presented in Table 1 which follows:

Example 2

This example has the goal of illustrating the amounts, in accordance with the invention, of agents used to disperse talc in a polypropylene resin.

Test No. 8

This test is a control test. No dispersing agent is used.

Thus, with the same equipment and under the same operating conditions as those of Example 1, we have mixed 200 grams of homopolymer polypropylene sold by the Appryl company under the trade name PPH 3120 MN 1, 300 grams of pulverulent talc sold by the Finnminerals company under the trade name FINNTALC M05, and 0.25 grams of thermal stabilizer sold by the Ciba-Geigy company under the name IRGANOX 1010.

The compound's MFI was then measured, according to the same operating mode as in Example 1, and the results obtained are 0.21 g/10 min at 230° C. with a load of 2.16 kg and of 77 g/10 min at 230° C. and under a load of 10 kg.

Test No. 9

This test illustrates the use, according to the invention, of 0.25% by weigh, based on the filler of styrene-maleic anhydride copolymer with a weight average molecular weight of about 1700.

Thus, using the same equipment and under the same operating conditions as those of Example 1, we have mixed 300 grams of pulverulent talc sold by Finnminerals company under the trade name FINNTALC M05, 0.25 grams of thermal stabilizer sold by Ciba-Geigy company under the trade name IRGANOX 1010, 0.75 grams of the styrene-

TABLE 1

| | | Control | | | Prior Art | Invention | | |
|---|---|---|---|---|---|---|---|---|
| Test No. | | 1 | 2 | 3 | 4 | 5 | 6 | 7 |
| Resin | Type | Polypropylene PPH 3120 MN1 | Polypropylene PPH 3120 MN1 | Polypropylene PPH 3120 MN1 | Polypropylene PPH 3120 MN1 | Polypropylene PPH 3120 MN1 | Polypropylene PPH 3120 MN1 | Polypropylene PPH 3120 MN1 |
| Filler | Type | FINNTALC M05 | FINNTALC M05 | FINNTALC M05 | FINNTALC M05 | FINNTALC M05 | FINNTALC M05 | FINNTALC M05 |
| | Quantity, %, by weight of filler + resin ratio | 60.45 | 60.45 | 60.45 | 60.45 | 60.45 | 60.45 | 60.45 |
| Dispersing agent | Type | | Sulfonated styrene-maleic anhydride Mw = about 1500 | Sulfonated styrene-maleic anhydride Mw = about 2000 | Stearyl phosphate | styrene-maleic anhydride Mw = about 1600 | styrene-maleic anhydride Mw = about 1700 | styrene-maleic anhydride Mw = about 1900 |
| | Quantity, %, by weight based on filler | 0 | 0.75 | 0.75 | 0.75 | 0.75 | 0.75 | 0.75 |
| MFI index (g/10 mm) | 230° C. 2.16 kg | 0 | 0 | 0 | 0 | 1.3 | 2.2 | 0 |
| | 230° C. 10 kg | 70 | 54.5 | 35.5 | 44.8 | 124 | 191 | 114 |

Mw = weight average molecular weight

Reference to Table 1 allows one to determine that the use, according to the invention, of a styrene-maleic anhydride copolymer with a weight average molecular weight between 1000 and 3000, especially between 1500 and 2000, results in highly filled thermoplastic compounds (more than 60% by weight of dry talc based on the total weight of the talc and the resin), with improved fluidity and homogeneity. In this formulation, there is a fluidity index (MFI) greater than 90 g/10 mm at 230° C. and 10 kg of filler, while tests Nos. 1 to 4 give compounds having clearly lower MFI indices.

maleic anhydride copolymer with weight average molecular weight of about 1700, and finally, 200 grams of polypropylene resin sold by Appryl company under the trade name PPH 3120 MN 1.

The compound's MFI was then measured, according to the same operating mode as in Example 1, and the results obtained are 2.13 g/10 min at 230° C. and under a load of 2.16 kg, and of 123 g/10 min at 230° C. and under a load of 10 kg.

Test No. 10

This test illustrates the use, according to the invention, of 0.50% by weight with respect to the filler, the same copolymer as that of test No. 9.

Thus, using the same equipment and under the same operating conditions as those of Example 1, we have mixed 1.50 grams of styrene-maleic anhydride copolymer with a weight average molecular weight of about 1700 with the same quantities of talc, thermal stabilizer, and thermoplastic resin as those of test No. 9.

The MFI of the compound prepared in this manner was then measured, according to the same operating mode as in Example 1, and the results obtained are 3.6 g/10 min at 230° C. and under a load of 2.16 kg, and of 190 g/10 min at 230° C. and under a load of 10 kg.

Test No. 11

This test illustrates the use, in accordance with the invention, of 0.75% by weight with respect to the filler of the same copolymer as that of test No. 9.

Thus, using the same equipment and under the same operating conditions as those of Example 1, we have mixed 2.25 grams of the styrene-maleic anhydride copolymer with a weight average molecular weight of about 1700 to the same quantities of talc, thermal stabilizer, and resin of those of test No. 9.

The MFI of the compound prepared in this manner was then measured, according to the same operating mode as in Example 1, and the results obtained are 2.5 g/10 min at 230° C. and under a load of 2.16 kg, and of 222 g/10 min at 230° C. and under a load of 10 kg.

Test No. 12

This test illustrates the use, according to the invention, of 1.00% by weight based on the filler of the same copolymer as that of test No. 9.

Thus, using the same equipment and under the same operating conditions as those of Example 1, we have mixed 3.00 grams of the styrene-maleic anhydride copolymer with an weight average molecular weight of about 1700 to the same quantities of talc, thermal stabilizer, and resin as those of test No. 9.

The MFI of the compound prepared in this manner was then measured, according to the same operating mode in Example 1, and the results obtained are 2.1 g/10 min at 230° C. and under a load of 2.16 kg, and of 150 g/10 min at 230° C. and under a load of 10 kg.

Test No. 13

This test illustrates the use, in accordance with the invention, of 2.0% by weight with respect to the filler of the same copolymer as that of test No. 9.

Thus, using the same equipment and under the same operating conditions as those of Example 1, we have mixed 6.00 grams of the styrene-maleic anhydride copolymer with a weight average molecular weight of about 1700 to the same quantities of talc, thermal stabilizer, and resin as those of test No. 9.

The MFI of the thermoplastic compound was then measured, according to the same operating mode as in Example 1, and the results obtained are 0.8 g/10 min at 230° C. and under a load of 2.16 kg, and of 92.1 g/10 min at 230° C. and under a load of 10 kg.

Test No. 14

This test illustrates the use, according to the invention, of 3.00% by weight based on the filler of the same copolymer as that of test No. 9.

Thus, using the same equipment and under the same operating conditions as those of Example 1, we have mixed 9.00 grams of the styrene-maleic anhydride copolymer with a weight average molecular weight of about 1700 to the same quantities of talc, thermal stabilizer, and resin as those of test No. 9.

The MFI of the thermoplastic compound was then measured, according to the same operating mode as in Example 1, and the results obtained are 0.64 g/10 min at 230° C. and under a load of 2.16 kg, and of 91.1 g/10 min at 230° C. and under a load of 10 kg.

The results of the different tests are tabulated in Table 2 below:

TABLE 2

| | | Control | Invention | | | | | |
|---|---|---|---|---|---|---|---|---|
| | Test No. | 8 | 9 | 10 | 11 | 12 | 13 | 14 |
| Resin | Type | Polypropylene PPH 3120 MN1 | Polypropylene PPH 3120 MN1 | Polypropylene PPH 3120 MN1 | Polypropylene PPH 3120 MN1 | Polypropylene PPH 3120 MN1 | Polypropylene PPH 3120 MN1 | Polypropylene PPH 3120 MN1 |
| Filler | Type | FINNTAL C MO5 | FINNTAL C MO5 | FINNTAL C MO5 | FINNTAL C MO5 | FINNTALC C MO5 | FINNTALC C MO5 | FINNTAL C MO5 |
| | Quantity, %, by weight of filler + resin ratio | 60.0 | 60.0 | 60.0 | 60.0 | 60.0 | 60.0 | 60.0 |
| Dispersing agent | Type | | Styrene-maleic anhydride Mw = 1700 | Styrene-maleic anhydride Mw = 1700 | Styrene-maleic anhydride Mw = 1700 | Styrene-maleic anhydride Mw = 1700 | Styrene-maleic anhydride Mw = 1700 | Styrene-maleic anhydride Mw = 1700 |
| | Quantity, %, by weight with respect to filler | 0 | 0.25 | 0.50 | 0.75 | 1.00 | 2.00 | 3.00 |
| MFI index (g/10 mm) | 230° C. 2.16 kg | 0.21 | 2.13 | 3.60 | 2.50 | 2.10 | 0.80 | 0.64 |
| | 230° C. 10 kg | 77 | 123 | 190 | 222 | 150 | 92.1 | 91.1 |

Mw = weight average molecular weight

Referring to Table 2 one can determine that the use, in accordance with the invention, of 0.25% to 3.0% by weight and especially from 0.50% to 1.0% by weight, based on the total filler weight, of styrene-maleic anhydride copolymer with a weight average molecular weight preferably between 1000 and 3000, and more preferably between 1500 and 2000, allows one to obtain thermoplastic compounds with high concentrations of talc (60% by weight of dry talc based on the total filler and resin weight), with improved stability, fluidity, and homogeneity over control compositions which do not contain the styrene-maleic anhydride copolymer. The thermoplastic compounds in accordance with the present invention result in an MFI greater than 90 g/10 min at 230° C. and under a load of 10 kg, while the controls have only a value of 77 g/10 min for a MFI measured under the same conditions. The MFI, measured at 230° C. and under a load of 2.16 kg is increased at least three times for the thermoplastic compounds in accordance with the invention, with respect to the control compound.

Example 3

This example has the goal of illustrating concentrations of talc which are higher than the preceding cases.

Test No. 15

This test is a control test and allows one to determine the poor homogeneity and fluidity represented by the low values of the MFI, which are obtained for a formulation without a dispersing agent and which include a filler rate equivalent to 80% by weight based on the total weight of the filler and of the resin.

Thus, using the same equipment and under the same operating conditions as those of Example 1, we have mixed 400 grams of pulverulent talc sold by the company Talc of Luzenac under the reference number 1445, of which 50% of the particles have an average diameter less than 9.9 micrometers (as determined by x-ray diffraction), 0.25 grams of thermal stabilizer sold by Ciba-Geigy company under the trade name IRGANOX 1010, 4.5 grams of a metal deactivator of the 10 times oxyethylated nonylphenol type, and 1.5 grams of another metal deactivator of the polyethylene glycol type having a molecular weight of 300 g/mol, and finally 100 grams of the polypropylene resin sold by Appryl company under the trade name PPH 3120 MN 1.

The MFI of the compound prepared in this manner was then measured, according to the same operating mode as that of Example 1, and the result obtained is 26.5 g/10 min at 230° C. and under a load of 2.16 kg.

Test 16

This test, in accordance with the invention, uses a styrene-maleic anhydride copolymer with a weight average molecular weight of about to 1700 as a dispersing agent. This test also shows the effectiveness of the dispersing agent used by permitting the comparison of MFI values of the control compound with the thermoplastic compound in accordance with the invention.

Thus, using the same equipment and under the same operating conditions as those of the preceding test, we have mixed the same ingredients in the same quantities as those of test No. 15 with the addition of 4.00 grams of styrene-maleic anhydride copolymer having a weight average molecular weight of about 1700.

The MFI of the compound prepared in this manner was then measured, according to the same operating mode as that of the Example 1, and the result obtained is 60 g/10 min and under a load of 2.16 kg.

The method according to the invention, thereby allows one to obtain a thermoplastic compound which is highly filled with talc (80% by weight) that is more stable, homogeneous and fluid than the one obtained without the use of the styrene-maleic anhydride copolymer as a dispersing agent, which thereby allows easier use of the thermoplastic compound during fabrication of plastic objects.

Example 4

This example has the goal of illustrating the possibilities of dispersing different fillers.

Test No. 17

This test is a control test for a polypropylene compound filled by means of a talc obtained from the southern France. No dispersing agent was used.

Thus, using the same equipment and under the same operating conditions as those of Example 1, we have mixed 300 grams of pulverulent talc sold by the company Talc of Luzenac under reference number 1445, 0.25 grams of thermal stabilizer sold by Ciba-Geigy company under the trade name IRGANOX 1010, and finally 200 grams of polypropylene resin sold by Appryl company under the trade name PPH 3120 MN 1.

The MFI of the compound prepared in this manner was then measured, according to the same operating mode as that of Example 1, and the results obtained are 3.3 g/10 min at 230° C. and under a load of 2.16 kg, and of 81.9 g/10 min at 230° C. and under a load of 10 kg.

Test 18

This test illustrates the use, in accordance with the invention, of a styrene-maleic anhydride copolymer with a weight average molecular weight of about 1700. It also allows one to demonstrate the effectiveness of the latter by allowing the comparison of the fluidity-index values of the thermoplastic compound in accordance with the invention and that of the control compound.

Thus, using the same equipment and under the same operating conditions as those of the preceding test, we have mixed the same ingredients in the same quantities as those of test No. 17 with the addition of 1.5 grams of the styrene-maleic anhydride copolymer with a weight average molecular weight of about 1700.

The MFI of the compound prepared in this manner was then measured, according to the same operating mode as that of Example 1, and the results obtained are 4.4 g/10 min at 230° C. and under a load of 2.16 kg, and 110 g/10 min at 230° C. and under a load of 10 kg.

Test No. 19

This test is a control test for a polypropylene compound filled with of Norwegian talc. No dispersing agent is used.

Thus, using the same equipment and under the same operating conditions as those of Example 1, we have mixed 300 grams of pulverulent talc sold by the company Norwegian Talc under the trade name MICROTALC IT EXTRA of which 100% of the particles have an average diameter less than 20 micrometers (as determined by sedimentation analysis, method: DIN 51033/66 115), 0.25 grams of thermal stabilizer sold by Ciba-Geigy company under the trade name IRGANOX 1010, and finally 200 grams of the polypropylene resin sold by Appryl company under the trade name PPH 3120 MN 1.

The MFI of the thermoplastic compound prepared in this manner was then measured, according to the same operating mode as that of Example 1, and the result obtained is 32.7 g/10 min at 230° C. and under a load of 10 kg.

Test No. 20

This test demonstrating the invention, uses a styrene-maleic anhydride copolymer with a weight average molecular weight of about 1700 as a dispersing agent.

This test also demonstrates the effectiveness of the dispersing agent used by permitting the comparison of the MFI values of the thermoplastic compound in accordance with the invention and those of the control compound of the preceding test.

Thus, using the same equipment and under the same operating conditions as those of the preceding test, we have mixed the same ingredients in the same quantities as those of test No. 19 with the addition of 1.5 grams of the styrene-maleic anhydride copolymer with a weight average molecular weight of about 1700.

The MFI of the thermoplastic compound prepared in this manner was then measured, according to the same operating mode as that of the Example 1, and the result obtained is 82.9 g/10 min at 230° C. and under a load of 10 kg.

Test No. 21

This test demonstrating the invention, uses a styrene-maleic anhydride copolymer with weight average molecular weight of about 1700 as a dispersing agent. This test also demonstrates the effectiveness of the dispersing agent used by allowing the comparison of MFI values of the thermoplastic compound in accordance with the invention and those of the control compound of the preceding test.

Thus, using the same equipment and under the same operating conditions as those of the preceding test, we have mixed the same ingredients in the same quantities as those of test No. 19 with the addition of 3.00 grams of styrene-maleic anhydride copolymer with a weight average molecular weight of about 1700.

The MFI of the thermoplastic compound prepared in this manner is then measured, according to the same operating mode as that of the example 1, and the result obtained is 82.9 g/10 min at 230° C. and under a load of 10 kg.

Test No. 22

This test is a control test for a polypropylene compound containing kaolin as the mineral filler. This control compound does not contain any dispersing agent.

Thus, using the same equipment and under the same operating conditions as those of Example 1, we have mixed 300 grams of pulverulent kaolin sold by Omya S. A. company under the trade name OMYA II in which 86% of the particles have an average diameter less than 2 micrometers (as determined by X-ray diffraction), 1.25 grams of thermal stabilizers sold by Ciba-Geigy company under the trade name IRGANOX 1010, and 200 grams of the same polypropylene resin sold by Appryl company under the trade name PPH 3120 MN 1.

The MFI of the thermoplastic compound prepared in this manner was then measured, according to the same operating mode as in the preceding tests, and the result obtained is 28.8 g/10 min at 230° C. and under a load of 2.16 kg.

Test No. 23

This test demonstrating the invention uses a styrene-maleic anhydride copolymer with weight average molecular weight of about 1700 as the dispersing agent. This test also demonstrates the effectiveness of the dispersing agent used by permitting the comparison of MFI values of the compound in accordance with the invention and those of the control compound of the preceding test.

Thus, using the same equipment and under the same operating conditions as in the preceding test, we have mixed the same ingredients in the same quantities as those of test No. 22 with the addition of 3.00 grams of styrene-maleic anhydride copolymer with a weight average molecular weight of about 1700.

The MFI of the thermoplastic compound prepared in this manner was then measured, according to the same operating mode as that of Example 1, and the result obtained is 130 g/10 min at 230° C. and under a load of 2.16 kg.

Test No. 24

This test is a control test for a polypropylene compound containing wollastonite as the mineral filler. This control compound does not contain any dispersing agent.

Thus, using the same equipment and under the same operating conditions as those of Example 1, we have mixed 300 grams of wollastonite sold by Croxton & Garry company under the trade name HYCON (mean fiber length 90 to 300; mean aspect ratio 10:1 to 20:1, of which 99.9% of particles are smaller than 45 micrometers determined by Alpine Air Jet A200). 0.25 grams of thermal stabilizer sold by Ciba-Geigy company under the trade name IRGANOX 1010, and finally 200 grams of the polypropylene resin sold by Appryl company under the trade name PPH 3120 MN 1.

The MFI of the thermoplastic compound prepared in this manner was then measured, according to the same operating mode as that of Example 1 and the result obtained is 146 g/10 min at 230° C. and under a load of 10 kg.

Test No. 25

This test demonstrating the invention uses a styrene-maleic anhydride copolymer with a weight average molecular weight of about 1700 as a dispersing agent. This test also demonstrates the effectiveness of the dispersing agent used by allowing the comparison of the MFI values of the thermoplastic compound in accordance with the invention and those of the control compound of the preceding test.

Thus, with the same equipment and under the same operating conditions as those of the preceding test, we have mixed the same ingredients in the same quantities as those of test No. 24 with the addition of 3.00 grams of styrene-maleic anhydride copolymer with a weight average molecular weight of about 1700.

The MFI of the thermoplastic compound prepared in this manner was then measured, according to the same operating mode as that of Example 1, and the result obtained is 194 g/10 min at 230° C. and under a load of 10 kg.

Test No. 26

This test is a control test for a polypropylene compound filled with natural calcium carbonate. No dispersing agent is used.

Thus, using the same equipment and under the same operating conditions as those of Example 1, we have mixed 350 grams of pulverulent calcium carbonate sold by Omya company S. A. under the trade name MILLICARB in which 36% of the particles have an average diameter less than 2 micrometers (as determined by laser scattering), 0.25 grams of the thermal stabilizer sold by Ciba-Geigy company under the trade name IRGANOX 1010, and finally 150 grams of the polypropylene resin sold by Appryl company under the trade name PPH 3120 MN 1.

The MFI of the thermoplastic compound prepared in this manner was then measured, according to the same operating mode as that of Example 1, and the results obtained are 3.2 g/10 min at 230° C. and under a load of 2.16 kg, and 80 g/10 min at 230° C. and under a load of 10 kg.

Test No. 27

This test demonstrating the invention uses a styrene-maleic anhydride copolymer with a weight average molecular weight of about 1700 as a dispersing agent. This test also demonstrates effectiveness of the dispersing agent used by allowing the comparison of the MFI values of the thermoplastic compound in accordance with the invention and those of the control compound of the preceding test.

Thus, using the same equipment and under the same operating conditions as those of the preceding test, we have mixed the same ingredients in the same quantities as those of test No. 26 with the addition of 3.5 grams of the styrene-maleic anhydride copolymer having a weight average molecular weight of about 1700.

The MFI of the thermoplastic compound prepared in this manner was then measured according to the same operating mode as that of Example 1, and the results obtained are 7.4 g/10 min at 230° C. and under a load of 2.16 kg, and of 127 g/10 min at 230° C. and under a load of 10 kg.

Test No. 28

This test is a control test for a polypropylene compound filled with silica. No dispersing agent is used.

Thus, using the same equipment and under the same operating conditions as those of Example 1, we have mixed 60 grams of pyrogenetic silica sold by Wacker company under the reference number N 20 with specific surface area according to BET on the order of 200±30 m²/g, 0.25 grams of thermal stabilizer sold by Ciba-Geigy company under the trade name IRGANOX 1010, and finally 200 grams of the polypropylene resin sold by Appryl company under the trade name PPH 3120 MN 1.

The MFI of the thermoplastic compound prepared in this manner is then measured, according to the same operating mode as that of Example 1, and the result obtained is 15.8 g/10 min at 230° C. and under a load of 2.16 kg.

Test No. 29

This test demonstrating the invention uses a styrene-maleic anhydride copolymer with a weight average molecular weight of about 1700 as a dispersing agent. This test also demonstrates the effectiveness of the dispersing agent used by allowing the comparison of the MFI values of the thermoplastic compound in accordance with the invention and those of the control compound of the preceding test.

Thus, using the same equipment and under the same operating conditions as those of the preceding test, we have mixed the same ingredients in the same quantities as those of test No. 28 with the addition of 0.50 grams of the styrene-maleic anhydride copolymer having a weight average molecular weight of about 1700.

The MFI of the thermoplastic compound prepared in this manner was then measured, according to the same operating mode as that of Example 1, and the result obtained was 107 g/10 min at 230° C. and under a load of 2.16 kg.

Test No. 30

This test is a control test for a polypropylene compound filled with magnesium hydroxide. No dispersing agent was used.

Thus, using the same equipment and under the same operating conditions as those of Example 1, we have mixed 300 grams of magnesium hydroxide sold by Martinswerk company under the reference MAGNIFIN H5 in which the residue at 45 micrometers was less than or equal to 0.1% (as determined by laser diffraction), 0.25 grams of thermal stabilizer sold by Ciba-Geigy company under the trade name IRGANOX 1010, and finally 200 grams of the polypropylene resin sold by Appryl company under the trade name of PPH 3120 MN 1.

The MFI of the thermoplastic compound prepared in this manner was then measured, according to the same operating mode as that of Example 1, and the result obtained was 63.6 g/10 min at 230° C. and under a load of 10 kg.

Test No. 31

This test demonstrating the invention uses a styrene-maleic anhydride copolymer with a weight average molecular weight of about 1700 as a dispersing agent. This test also demonstrates the effectiveness of the dispersing agent used by allowing the comparison of the MFI values of the thermoplastic compound in accordance with the invention and those of the control compound of the preceding test.

Thus, using the same equipment and under the same operating conditions as those of the preceding test, we have mixed the same ingredients in the same quantities as those of test No. 30 with the addition of 3.00 grams of the styrene-maleic anhydride copolymer having a weight average molecular weight of about 1700.

The MFI of the thermoplastic compound prepared in this manner was then measured, according to the same operating mode as that of Example 1, and the result obtained is 77.7 g/10 min at 230° C. and under a load of 10 kg.

The results of different tests of the examples are tabulated in Tables 3 and 3b below:

TABLE 3

| | Test No. | Control 17 | Invention 18 | Control 19 | Invention 20 | Invention 21 | Control 22 | Invention 23 |
|---|---|---|---|---|---|---|---|---|
| Resin | Type | Poly-propylene PPH 3120 MN1 | Poly-propylene PPH 3120 MN1 | Poly-propylene PPH 3120 MN1 | Poly-propylene PPH 3120 MN1 | Poly-propylene PPH 3120 MN1 | Poly-propylene PPH 3120 MN1 | Poly-propylene PPH 3120 MN1 |
| Filler | Type | Talc of Luzenac 1445 | Talc of Luzenac 1445 | MICROTALC IT Extra | MICROTALC IT Extra | MICROTALC IT Extra | Kaolin OMYA II | Kaolin OMYA II |
| | Quantity, %, by weight of filler + resin | 60.0 | 60.0 | 60.0 | 60.0 | 60.0 | 60.0 | 60.0 |
| Dispersing agent | Type | — | Styrene-maleic anhydride Mw = 1700 | — | Styrene-maleic anhydride Mw = 1700 | Styrene-maleic anhydride Mw = 1700 | — | Styrene-maleic anhydride Mw = 1700 |
| | Quantity, %, by weight with respect to filler | 0 | 0.5 | 0 | 0.5 | 1.0 | 0 | 1.0 |
| MFI index (g/10 mm) | 230° C. 2.16 kg | 3.3 | 4.4 | — | — | — | 28.8 | 130 |
| | 230° C. 10 kg | 81.9 | 110 | 32.7 | 82.9 | 82.9 | 0 | — |

Mw = weight average molecular weight

TABLE 3b

| Test No. | | Control 24 | Invention 25 | Control 26 | Invention 27 | Control 28 | I Invention 29 | Control 30 | Invention 31 |
|---|---|---|---|---|---|---|---|---|---|
| Resin | Type | Poly-propylene PPH 3120 MN1 | Poly-propylene PPH 3120 MN1 | Poly-propylene PPH 3120 MN1 | Poly-propylene PPH 3120 MN1 | Poly-propylene PPH 3120 MN1 | Poly-propylene PPH 3120 MN1 | Poly-propylene PPH 3120 MN1 | Poly-propylene PPH 3120 MN1 |
| Filler | Type | Wolla-stonite HYCON | Wolla-stonite HYCON | MILLICARB | MILLICARB | Silicon N20 | Silicon N20 | MAGNIFIN H5 | MAGNIFIN H5 |
| | Quantity, %, by weight of filler + resin | 60.0 | 60.00 | 70.0 | 70.0 | 23.1 | 23.1 | 60.0 | 60.00 |
| Dispersing agent | Type | — | Styrene-maleic anhydride Mw = 1700 | — | Styrene-maleic anhydride Mw = 1700 | — | Styrene-maleic anhydride Mw = 1700 | — | Styrene-maleic anhydride Mw = 1700 |
| | Quantity, %, by weight with respect to filler | 0 | 1.0 | 0 | 1.0 | — | 0.83 | — | 1.0 |
| MFI index (g/10 mm) | 230° C. 2.16 kg | — | — | 3.2 | 7.4 | 15.8 | 107 | — | — |
| | 230° C. 10 kg | 146 | 194 | 80 | 127 | — | — | 63.6 | 77.7 |

Mw = weight average molecular weight

Referring to Tables 3 and 3b allows one to determine the possibility of obtaining thermoplastic compounds filled with different fillers, thermoplastic compounds are fluid, and homogeneous because of the use, according to the invention, of a styrene-maleic anhydride copolymer with a weight average molecular weight preferably between 1000 and 3000, and more preferably between 1500 and 2000, as the dispersing agent.

Example 5

This example has the goal of illustrating the possibilities of dispersing the fillers in different thermoplastic resins.
Test No. 32

This test is a control test for a thermoplastic compound of low density polyethylene type filled by means of pyrogenetic silica. No dispersing agent was used.

Thus, using the same equipment and under the same operating conditions as those of Example 1, with the exception of the temperature of the tank which is heated electrically to 190° C., we have mixed 120 grams of pulverulent pyrogenetic silica sold by Wacker company under reference N 20, 0.25 grams of the thermal stabilizer sold by Ciba-Geigy company under the trade name IRGANOX 1010, and finally 400 grams of the low density polyethylene resin sold by Norsolor company under the reference MA 2004, grade 20.

The MFI of the thermoplastic compound prepared in this manner was then measured at 190° C. according to the same operating mode as that of Example 1, and the result obtained is 0.92 g/10 min at 190° C. and under a load of 2.16 kg.
Test No. 33

This test demonstrating the invention uses a styrene-maleic anhydride copolymer having a weight average molecular weight of about 1700 as a dispersing agent. This test also demonstrates the effectiveness of the dispersing agent used by allowing the comparison of MFI values of the thermoplastic compound in accordance with the invention and those of the control compound of the preceding test.

Thus, using the same equipment and under the same operating conditions as those of the preceding test, we have mixed the same ingredients in the same quantities as those of test No. 32 with the addition of 1.20 grams of the styrene-maleic anhydride copolymer with a weight average molecular weight of about 1700.

The MFI of the thermoplastic compound prepared in this manner was then measured, according to the same operating mode as that of the preceding example and the result obtained is 1.86 g/10 min at 190° C. and under a load of 2.16 kg.
Test No. 34

This test is a control test for a thermoplastic compound of the polyethylene-polypropylene copolymer type filled with talc. No dispersing agent is used.

Thus, in a Guittard mixer with a Z-shaped arm having a 1.5-liter capacity, we slowly introduced under stirring at about 7.5 rpm a charge of 300 grams of a talc that came from the southern France and is sold by the company Talcs of Luzenac under the reference number 1445.

Once the introduction of the pulverulent talc was completed, we waited while still stirring. After 45 minutes, the talc reached 240° C. Then, we added 0.25 grams of thermal stabilizer sold by Ciba-Geigy company under the trade name IRGANOX 1010, and finally 200 grams of the polyethylene-polypropylene copolymer sold by Appryl company under the trade name PPC 3120 MN4.

The entire batch was mixed for 15 minutes at this temperature and at the speed of 75 rpm.

The mixing unit was then opened and all of the talc remaining on the walls was then remixed into the compound which was stirred for 5 additional minutes.

The MFI of the thermoplastic compound prepared in this manner is then measured according to the same operating mode as that of Example 1, and the result obtained is 20.2 g/10 min at 230° C. and under a load of 5 kg.
Test No. 35

This test demonstrating the invention uses a styrene-maleic anhydride copolymer with a weight average molecular weight of about 1700 as a dispersing agent. This test also demonstrates the effectiveness of the dispersing agent used by allowing the comparison of the MFI values of the thermoplastic compound in accordance with the invention and those of the control compound of the preceding test.

Thus, using the same equipment and under the same operating conditions as those of the preceding test, we mixed the same ingredients in the same quantities as those of test No. 34 with the addition of 3 grams of the styrene-maleic anhydride copolymer of a weight average molecular weight of about 1700.

The MFI of the thermoplastic compound prepared in this manner is then measured, according to the same operating mode as that of the preceding example, and the result obtained is 48.3 g/10 min at 230° C. and under a load of 5 kg.

Test No. 36

This test is a control test for a thermoplastic compound of the butene copolymer type filled with talc. No dispersing agent is used.

Thus, in a Guittard mixing unit with a Z-shaped arm having a capacity of 1.5 liters, we slowly stirred at about 7.5 rpm, 375 grams of a talc that came from southern France and which is sold by the company Talcs of Luzenac under the reference number 1445.

Once the introduction of the pulverulent talc was completed, we continued stirring until the talc reached 150° C. Then, we added 0.25 grams of thermal stabilizer sold by the company Ciba-Geigy under the trade name IRGANOX 1010, and finally 125 grams of the copolymer sold by the company Huls under the trade name VESTOPLAST 408.

The entire batch was mixed for 15 minutes at a temperature of 150° C. and at the speed of 75 rpm.

The mixing unit was then opened up and all of the talc remaining on the walls was then remixed into the compound which was stirred for another 5 minutes.

The MFI of the thermoplastic compound prepared in this manner was then measured according to the same operating mode as that of Example 1, and the result obtained is 2.98 g/10 min at 150° C. and under a load of 5 kg.

Test No. 37

This test demonstrating the invention uses a styrene-maleic anhydride copolymer with a weight average molecular weight of about 1700 as a dispersing agent. This test also demonstrates the effectiveness of the dispersing agent used while permitting the comparison of the MFI values of the compound in accordance with the invention and those of the control compound of the preceding test.

Thus, using the same equipment and under the same operating conditions as those of the preceding test, we mixed the same ingredients in the same quantities as those of test No. 36 with the addition of 3.75 grams of the styrene-maleic anhydride copolymer with a weight average molecular weight of about 1700.

The MFI of the compound prepared in this manner is then measured, according to the same operating mode as that of the preceding example, and the result obtained is 8.77 g/10 min at 150° C. and under a load of 5 kg.

Test No. 38

This test is a control test for a thermoplastic compound of the polyethylene type filled with aluminum hydroxide. No dispersing agent is used.

Thus, using the same equipment and under the same operating conditions as those of test No. 32, we mixed 350 grams of aluminum hydroxide sold by Martinswerk company under the trade name MARTINAL OL 104, with average diameter from 1.3 to 2.6 micrometers, 0.25 grams of thermal stabilizer sold by Ciba-Geigy company under the trade name IRGANOX 1010, and finally 150 grams of the low density polyethylene resin sold by Norsolor company under the reference MA 2004 grade 20.

The MFI of the thermoplastic compound prepared in this manner was then measured at 190° C., according to the same operating mode as that of example 1, and the result obtained is 0.0 g/10 min at 190° C. and under a load of 10 kg.

Test No. 39

This test demonstrating the invention uses as a filler of the aluminum hydroxide type previously treated with 1% by weight, based on the filler, of styrene-maleic anhydride copolymer with a weight average molecular weight of about 1700.

This test also demonstrates the effectiveness of the treatment agent used while allowing the comparison of the MFI values of the compound in accordance with the invention and those of the control compound of the preceding test.

Thus, in a high-speed Guedu mixing unit with a 5-liter capacity, we introduced 600 grams of aluminum hydroxide sold by Martinswerk company under the trade name MARTINAL OL 104. The mixing unit was preheated electrically to 130° C.–140° C.

Then we introduced 6 grams of the styrene-maleic anhydride copolymer with a weight average molecular weight of about 1700 before vigorously stirring the mixture at the speed of approximately 1500 rpm for 30 minutes.

At the end of these 30 minutes, the mixture was cooled to room temperature.

350 grams of the filler treated in this manner were then mixed with the same quantities and type of resin and thermal stabilizer as in test No. 38 and under the same operating conditions.

The MFI of the thermoplastic compound prepared in this manner was then measured at 190° C. according to the same operating mode as that of Example 1, and the result obtained was 9.6 g/10 min at 190° C. and under a load of 10 kg.

Test No. 40

This test is a control test for a thermoplastic compound of the ethylene-vinyl acetate copolymer (EVA) with 19% vinyl acetate filled by means of chalk. No dispersing agent was used.

Thus, in a Guittard mixing unit with a Z-shaped arm having a 1.5-liter capacity, we slowly stirred at around 7.5 rpm, 300 grams of a chalk from Champagne sold by the company Omya S.A. under the trade name ETIQUETTE VIOLETTE of which 36% of the particles have an average diameter of less than 2 micrometers (as determined by X-ray diffraction).

Once the introduction of the pulverulent chalk was completed, we maintained the same stirring until the chalk reached 190° C. We then added 0.25 grams of thermal stabilizer sold by Ciba-Geigy company under the trade name IRGANOX 1010, and finally 200 grams of the EVA copolymer sold by Enimont company under the trade name RIBLENE FV 2040.

The entire batch was mixed for 15 minutes at this temperature and at the speed of 75 rpm.

The mixing unit was then opened up and all of the chalk remaining on the walls was remixed into the compound which was stirred for an additional 5 minutes.

The MFI of the thermoplastic compound prepared in this manner was then measured according to the same operating mode as that of Example 1, and the result obtained was 14.4 g/10 min at 190° C. and under a load of 21.6 kg.

Test No. 41

This test, which illustrates the invention, uses as a dispersing agent a styrene-maleic anhydride copolymer with a weight average molecular weight of about 1700. This test also demonstrates the effectiveness of the dispersing agent used while allowing the comparison of the MFI values of the compound in accordance with the invention and those of the control compound of the preceding test.

Thus, with the same equipment and under the same operating conditions as those of the preceding test, we mixed the same ingredients in the same quantities as those of test No. 40 with the addition of 3.00 grams of the styrene-maleic anhydride copolymer with a weight average molecular weight of about 1700.

The MFI of the thermoplastic compound prepared in this manner was then measured, according to the same operating mode as that of the preceding example, the result obtained was 20.7 g/10 min at 190° C. and under a load of 21.6 kg.

The results of the different tests of the examples are tabulated in Tables 4 and 4b below:

Example 6

The goal of this example is to illustrate that the mechanical properties of the thermoplastic compounds, in accordance with the invention, are not degraded.

In order to accomplish this, in a laboratory cokneader unit of the BUSS MDK/E46 type having a kneading zone which is heated electrically, we introduced a mixture for the control tests No. 42 and No. 44 that has the following composition expressed in parts by weight:

TABLE 4

| | Test No. | Control 32 | Invention 33 | Control 34 | Invention 35 | Control 36 | Invention 37 |
|---|---|---|---|---|---|---|---|
| Resin | Type | Polyethylene MA 2004 grade 20 | Polyethylene MA 2004 grade 20 | Copolymer PPC 3120 MN4 | Copolymer PPC 3120 MN4 | Copolymer VESTOPLAST 408 | Copolymer VESTOPLAST 408 |
| Filler | Type | Silica N20 | Silica N20 | Talc de Luzenac 1445 | Talc de Luzenac 1445 | Talc de Luzenac 1445 | Talc de Luzenac 1445 |
| | Quantity, %, by weight of filler + resin ratio | 23.1 | 23.1 | 60.0 | 60.0 | 75.0 | 75.0 |
| Dispersing agent | Type | — | Styrene-maleic anhydride Mw = 1700 | — | Styrene-maleic anhydride Mw = 1700 | — | Styrene-maleic anhydride Mw = 1700 |
| | Quantity, %, by weight with respect to filler | 0 | 1.0 | 0 | 1.0 | 0 | 1.0 |
| MFI index (g/10 mm) | | 0.92 to 190° C. and 2.16 kg | 1.86 to 190° C. and 2.16 kg | 20.2 to 230° C. and 5 kg | 48.3 to 230° C. and 5 kg | 2.98 to 150° C. and 5 kg | 8.77 to 150° C. and 5 kg |

Mw = weight average molecular weight

TABLE 4b

| | | Control | Invention | Control | Invention |
|---|---|---|---|---|---|
| | Test No. | 38 | 39 | 40 | 41 |
| Resin | Type | Polyethylene MA 2004 grade 20 | Polyethylene MA 2004 grade 20 | Copolymer EVA RIBLENE FV 2040 | Copolymer EVA RIBLENE FV 2040 |
| Filler | Type | Aluminum hydrate MARTINAL OL 104 | Aluminum hydrate MARTINAL OL 104 treated with 1% SAM MW = 1700 | ETIQUETTE VIOLETTE | ETIQUETTE VIOLETTE |
| | Quantity, %, by weight of filler + resin ratio | 70.0 | 70.0 | 60.0 | 60.0 |
| Dispersing agent | Type | — | Styrene-maleic anhydride Mw = 1700 | — | Styrene-maleic anhydride Mw = 1700 |
| | Quantity, %, by weight with respect to filler | 0 | — | 0 | 1.0 |
| MFI index (g/10 mm) | | 0 to 190° C. and 10 kg | 9.6 to 190° C. and 10 kg | 14.4 to 190° C. and 21.6 kg | 20.7 to 190° C. and 21.6 kg |

Mw = weight average molecular weight

Referring to Tables 4 and 4b allows one to determine that the use, according to the invention, of a styrene-maleic anhydride copolymer with a weight average molecular weight preferably between 1000 and 3000, and more preferably between 1500 and 2000, allows one to obtain thermoplastic compounds in accordance with the invention, with stability, fluidity and homogeneity which are improved over thermoplastic compounds that do not include the styrene-maleic anhydride of the invention. In other words, thermoplastic compounds in accordance with the present invention, have an MFI which is clearly greater than the control compounds.

| | |
|---|---|
| MICROTALC IT EXTRA of Norwegian Talc Company | 60 |
| Polypropylene PROPATHENE GYM 45 from ICI Company (fluidity index 15, 230° C., 2 kg) | 40 | and for the tests in accordance with the invention, No. 43 and No. 45, a mixture which has the following composition expressed in parts by weight:

| MICROTALC IT EXTRA | 60 |
| --- | --- |
| of Norwegian Talc Company | |
| Polypropylene | 39.52 |
| PROPATHENE GYM 45 from ICI Company | |
| (fluidity index 15, 230° C., 2 kg) | |
| Dispersing agent | 0.48 |
| Styrene-maleic anhydride copolymer with | |
| a weight average molecular weight about 1700 | |

These thermoplastic compounds were premixed at room temperature then transferred into the hopper of the BUSS cokneader unit whose temperature of the kneading zone was about 195° C. and whose output rate was 15 kg per hour.

The MFI of the thermoplastic compounds prepared in this manner were then measured, according to the same operating mode as that of Example 1, and the results obtained were:

For control tests No. 42 and No. 44:
7.5 g/10 min at 230° C. and under a load of 5 kg
For tests in accordance with the invention No. 43 and No. 45:
19.5 g/10 min at 230° C. and under a load of 5 kg.

Once the MFI measurement is taken, one then proceeds to the next dispersion of the thermoplastic compounds obtained previously in the propylene marketed by ICI company under the trade name of PROPATHENE GYM 45.

In order to do this, one proceeds by injecting standard test tubes (ISO type) by means of A NETSTAL Sycap 170/90 MP press whose main parameters of adjustment are:
Diameter of the screw 32 mm
Temperature of the material in the cylinder=230° C.
Mold temperature=40° C.
Injection pressure=550 bars The thermoplastic compounds expressed in parts by weight are then:

| Control test No. 42: | |
| --- | --- |
| MICROTALC IT EXTRA | 20 |
| of Norwegian Talc Company | |
| Polypropylene | 80 |
| PROPATHENE GYM 45 (ICI) | |
| Test No. 43. in accordance with the invention: | |
| MICROTALC IT EXTRA | 20 |
| of Norwegian Talc Company | |
| Polypropylene | 79.84 |
| PROPATHENE GYM 45 (ICI) | |
| Dispersing agent | 0.16 |
| Styrene-maleic anhydride copolymer | |
| with an weight average molecular weight | |
| about 1700 | |
| Control test No. 44: | |
| MICROTALC IT EXTRA | 40 |
| of Norwegian Talc Company | |
| Polypropylene | 60 |
| PROPATHENE GYM 45 (ICI) | |
| Test No. 45. in accordance with the invention: | |
| MICROTALC IT EXTRA | 40 |
| of Norwegian Talc Company | |
| Polypropylene | 79.68 |
| PROPATHENE GYM 45 (ICI) | |
| Dispersing agent | 0.32 |
| Styrene-maleic anhydride copolymer | |
| with an weight average molecular weight | |
| about 1700 | |

These different thermoplastic compounds have the mechanical properties summarized in Table 5 which follows and were determined according to the standard NF T 51-034 or ISO R527 for stress characteristics (tensile yield stress, tensile yield strain, tensile break, tensile strain to failure), in accordance with standard NF T 51-035 or ISO 179 for un-notched Charpy method, according to standard NF T 51-001 or ISO 178 for the flexural modulus.

TABLE 5

| | | Test No. | | | |
| --- | --- | --- | --- | --- | --- |
| | | Control 42 | Invention 43 | Control 44 | Invention 45 |
| Compound in parts before mixing | Polypropylene Propathene Gym 45 | 40 | 39.52 | 40 | 39.52 |
| | Talc Microtalc IT | 60 | 60 | 60 | 60 |
| | Styrene-maleic anhydride copolymer | 0 | 0.48 | 0 | 0.48 |
| MFI (g/10 min) at 230° C. - 5 kg | | 7.5 | 19.5 | 7.5 | 19.5 |
| Composition in parts after pressed injection | Talc | 20 | 20 | 40 | 40 |
| Mechanical properties | Tensile yield stress (Mpa) | 36.4 | 37 | 35.6 | 37.6 |
| | Tensile yield strain (Mpa) | 5.8 | 5.8 | 3.9 | 3.9 |
| | Tensile break (Mpa) | 28.7 | 28.2 | 34.4 | 30 |
| | Tensile strain (%) to failure | 27.1 | 20.9 | 4.7 | 4.2 |
| | Flexural modulus at conventional deflexion (Mpa) Un-notched Charpy impact | 2.2 | 2.3 | 2.4 | 2.4 |
| | °C. (mJ/mm$^2$) | 35 | 36 | 31 | 28 |
| | at −23° (mJ/mm$^2$) | 25 | 28 | 24 | 24 |

The reading of Table 5 allows one to determine that the compounds in accordance with the invention are more homogeneous and more stable than the control compounds (MFI more elevated while still having mechanical properties of the same order.

What is claimed as new and is desired to be secured by Letters Patent of the United States is:

1. A method of dispersing a mineral filler, comprising:

mixing a styrene-maleic anhydride copolymer with a pulverulent mineral filler and a thermoplastic resin, wherein said styrene-maleic anhydride copolymer is present in an amount of from 0.25% to 3% by weight, based on the total weight of the pulverulent filler, wherein said styrene-maleic anhydride copolymer has a weight average molecular weight between 1000 and 3000; and wherein said thermoplastic resin is selected from the group consisting of (a) a hydrocarbon homopolymer without an aryl group having a backbone of only carbon; (b) a copolymer without an aryl group having a molecule consisting of carbon, hydrogen and oxygen in which the oxygen content in atoms does not exceed 22% by weight, based on the total amount of atoms in the polymer molecule and (c) a mixture of said homopolymer and said copolymer; and wherein said pulverulent mineral filler is basic or has surfaces that have free hydroxyl groups.

2. The method of claim 1 wherein said pulverulent mineral fillers are selected from the group consisting of natural or synthetic calcium carbonate, talc, kaolin, aluminum silicate, mica, wollastonite, bentonite, pyrogenetic silica, magnesium hydroxide, aluminum hydroxide, calcium hydroxide, iron hydroxide, and mixtures thereof.

3. The method of claim 1 wherein said pulverulent mineral filler is talc.

4. The method of claim 1 wherein said thermoplastic resin is selected from the group consisting of a homopolymer or copolymer of ethylene, propylene, butene, butadiene, butylene, isomers of butylene, ethylene-vinyl acetate and mixtures thereof.

5. The method of claim 1 wherein said thermoplastic resin is polypropylene.

6. The method of claim 1 wherein said styrene-maleic anhydride copolymer is present in an amount of from 0.5% to 1% by weight based on the total weight of the pulverulent mineral filler.

7. The method of claim 1 wherein said styrene-maleic anhydride has a weight average molecular weight of 1500 to 2000.

8. The method of claim 1, wherein the pulverulent mineral filler is present in an amount of 20 to 80% by weight, based on the total weight of the filler and of the resin.

* * * * *